(12) United States Patent
Takahashi

(10) Patent No.: US 11,705,254 B2
(45) Date of Patent: Jul. 18, 2023

(54) WIRING COMPONENT HOLDER FOR HOLDING WIRES

(71) Applicant: Hitachi Metals, Ltd., Tokyo (JP)

(72) Inventor: Noriyuki Takahashi, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/587,122

(22) Filed: Jan. 28, 2022

(65) Prior Publication Data

US 2022/0246330 A1 Aug. 4, 2022

(30) Foreign Application Priority Data

Feb. 2, 2021 (JP) ................... 2021-014995

(51) Int. Cl.
*H01R 43/28* (2006.01)
*H01B 13/012* (2006.01)

(52) U.S. Cl.
CPC ....... *H01B 13/01209* (2013.01); *H01R 43/28* (2013.01)

(58) Field of Classification Search
CPC .......................... H01B 13/01209; H01R 43/28
USPC ......................................................... 174/135
See application file for complete search history.

(56) References Cited

U.S. PATENT DOCUMENTS

| | | | | |
|---|---|---|---|---|
| 2,354,919 A | * | 8/1944 | Lockwood | F16L 3/2235 248/68.1 |
| 5,613,655 A | * | 3/1997 | Marion | F16L 3/2235 24/339 |
| 5,941,483 A | * | 8/1999 | Baginski | F16L 3/237 248/68.1 |
| 6,528,728 B1 | * | 3/2003 | Shima | H02G 3/0437 174/101 |
| 7,457,506 B1 | * | 11/2008 | Osborne, II | F16L 3/2235 385/136 |
| 9,190,192 B2 | | 11/2015 | Tomita et al. | |
| 2006/0001261 A1 | * | 1/2006 | Miyajima | F16L 5/14 285/136.1 |
| 2006/0249636 A1 | * | 11/2006 | Thiedig | F16L 55/035 248/74.1 |
| 2013/0220670 A1 | | 8/2013 | Tomita et al. | |
| 2015/0096802 A1 | * | 4/2015 | Itani | B60R 16/0215 174/72 A |
| 2017/0335993 A1 | * | 11/2017 | Tawata | F16L 3/1091 |
| 2018/0350486 A1 | * | 12/2018 | Egami | H01B 13/01209 |
| 2019/0120408 A1 | * | 4/2019 | Milner | F16B 2/065 |

FOREIGN PATENT DOCUMENTS

JP 2013-183486 A 9/2013

* cited by examiner

*Primary Examiner* — Timothy J Thompson
*Assistant Examiner* — Michael F McAllister
(74) *Attorney, Agent, or Firm* — Thomas W. Cole; Calderon Safran & Cole P.C.

(57) ABSTRACT

A wiring component includes a plurality of electric wires aligned in a predetermined alignment direction, and a holder to hold the plurality of electric wires. The holder includes a pair of resin members that sandwich longitudinal portions of the plurality of electric wires in a perpendicular direction perpendicular to the alignment direction, and the pair of resin members are recess-projection fitted between the plurality of electric wires.

6 Claims, 6 Drawing Sheets

WIRING COMPONENT HOLDER FOR HOLDING WIRES

CROSS-REFERENCE TO RELATED APPLICATIONS

The present patent application claims the priority of Japanese patent application No. 2021-014995 filed on Feb. 2, 2021, and the entire contents thereof are hereby incorporated by reference.

TECHNICAL FIELD

The present invention relates to a wiring component in which plural electric wires are held by a holder.

BACKGROUND ART

A holder made of a resin and used to collectively hold plural electric wires aligned in a predetermined alignment direction has been conventionally known. The present applicant has proposed such a holder which is described in Patent Literature 1.

The holder (cable holder) described in Patent Literature 1 is formed by combining a pair of holding members made of a resin. Each of the pair of holding members has a flat surface extending in the alignment direction of the plural electric wires, and plural grooves which are recessed from this flat surface. The pair of holding members are arranged in such a manner that the respective flat surfaces face each other, and the plural electric wires are respectively inserted through holding holes each formed by combining the respective grooves on the holding members.

CITATION LIST

Patent Literature

Patent Literature 1: JP 2013-183486A

SUMMARY OF THE INVENTION

In the case that the holder formed by combining a pair of resin members as described above is used to hold, e.g., plural electric wires for supplying currents to windings of an electric motor, it is necessary to ensure that a sufficient creepage distance satisfying the required PDIV (Partial Discharge Inception Voltage) is provided between the electric wires to prevent partial discharge between these electric wires.

In case of the holder described in Patent Literature 1, a distance between the plural grooves on the flat surface is the creepage distance between the electric wires. Therefore, to ensure that this creepage distance is sufficient, it is necessary to increase a length of the pair of holding members in the alignment direction of the plural electric wires to increase the distances between the plural electric wires, which results in that the holder is long and large. Thus, when the holder is used to hold, e.g., electric wires for supplying currents to the electric motor as a driving source of an automobile that requires space saving, it may be difficult to ensure a space for installing the plural electric wires and the holder.

Therefore, it is an object of the invention to provide a wiring component capable of preventing occurrence of electric discharge between plural electric wires while suppressing distances between the plural electric wires.

So as to achieve the above object, one aspect of the invention provides a wiring component, comprising:
a plurality of electric wires aligned in a predetermined alignment direction; and
a holder to hold the plurality of electric wires,
wherein the holder comprises a pair of resin members that sandwich longitudinal portions of the plurality of electric wires in a perpendicular direction perpendicular to the alignment direction, and
wherein the pair of resin members are recess-projection fitted between the plurality of electric wires.

Effects of the Invention

According to the present invention, it is possible to provide a wiring component capable of preventing occurrence of electric discharge between plural electric wires while suppressing distances between the plural electric wires.

BEST MODE FOR CARRYING OUT THE INVENTION

Embodiment

Figure 1A:
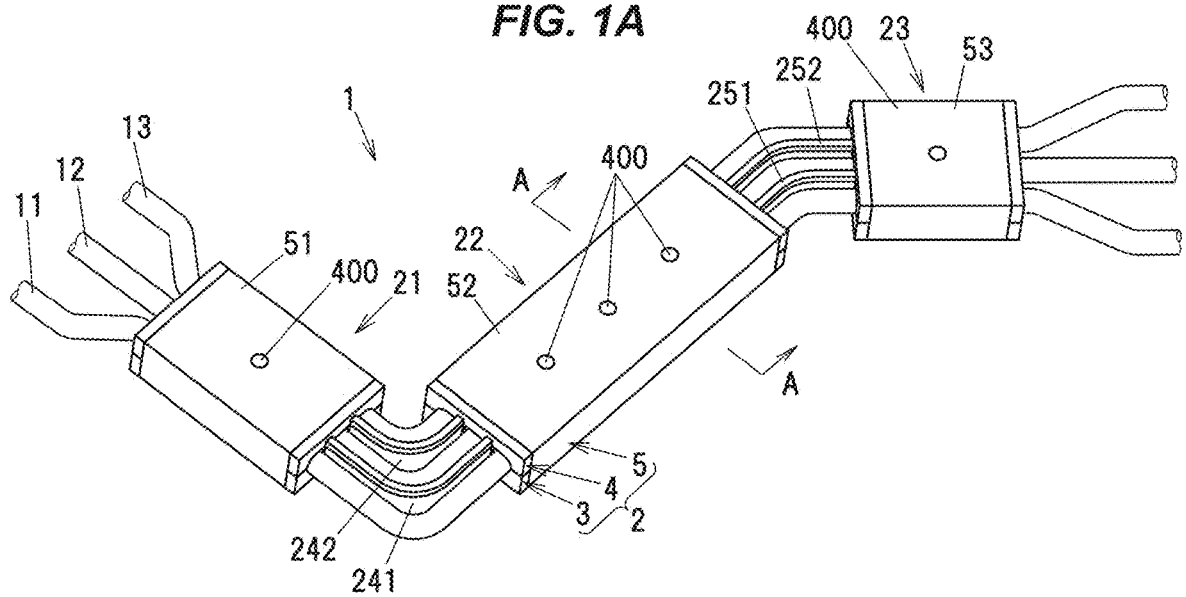
FIG. 1A is an external perspective view showing a wiring component in an embodiment of the present invention.

FIG. 1A is an external perspective view showing a wiring component in an embodiment of the invention. A wiring component 1 is installed in, e.g., an automobile and used to supply currents to an electric motor (three-phase AC motor) that generates a driving force for travel of the automobile. In the following description, the terms "upper" and "lower" are used for convenience of explanation, but these terms do not necessarily specify the positions when the wiring component 1 is in use.

(General Configuration of Wiring Component 1)
The wiring component 1 includes plural electric wires 11-13 aligned in a predetermined alignment direction, and a holder 2 to hold the plural electric wires 11-13. The holder 2 integrally has first to third blocks 21-23 aligned along a longitudinal direction of the plural electric wires 11-13, and wall portions 241, 242, 251, 252 that are interposed between the plural electric wires 11-13 and connect between the first to third blocks 21-23.

In addition, the holder 2 is composed of a lower retainer 3 and an upper retainer 4 as a pair of resin members that sandwich longitudinal portions of the plural electric wires 11-13, and a molded resin member 5 molded to cover and integrate the lower retainer 3 and the upper retainer 4.

The lower retainer 3 and the upper retainer 4 are resin injection-molded articles and sandwich the longitudinal portions of the plural electric wires 11-13 in a perpendicular direction that is perpendicular to an alignment direction of the electric wires 11-13. For example, PPS (polyphenylene sulfide), etc., excellent in heat resistance and electrical insulation properties can be suitably used as a resin material to form the lower retainer 3, the upper retainer 4 and the molded resin member 5.

Figure 1B:
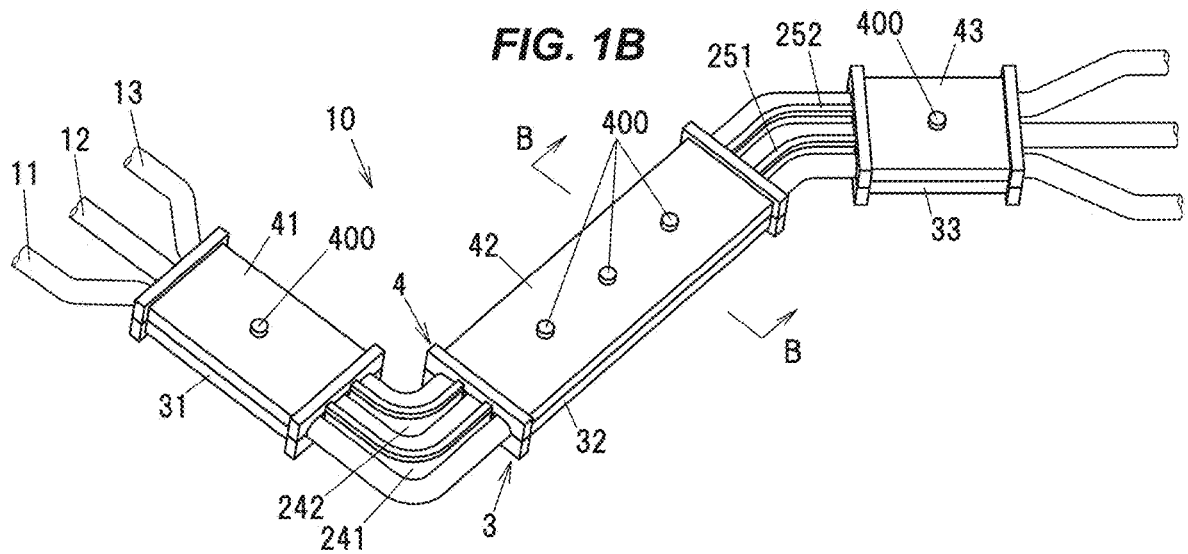
FIG. 1B is a perspective view showing a lower retainer and an upper retainer together with plural electric wires in a state in which a molded resin member is not formed.
Figure 1C:
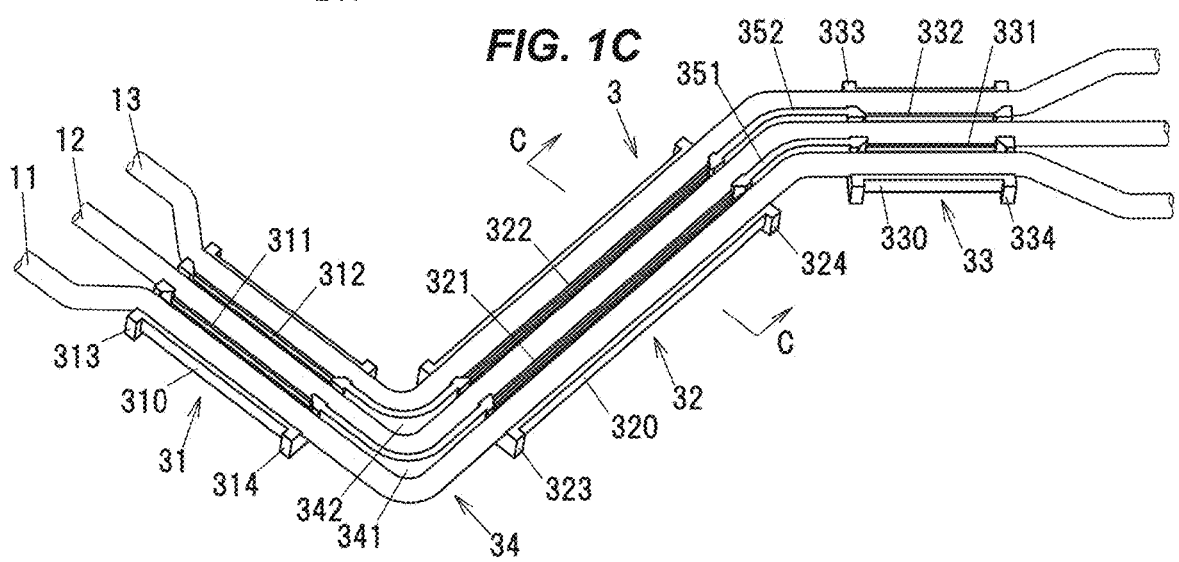
FIG. 1C is a diagram illustrating the lower retainer and the plural electric wires.
Figure 2A:
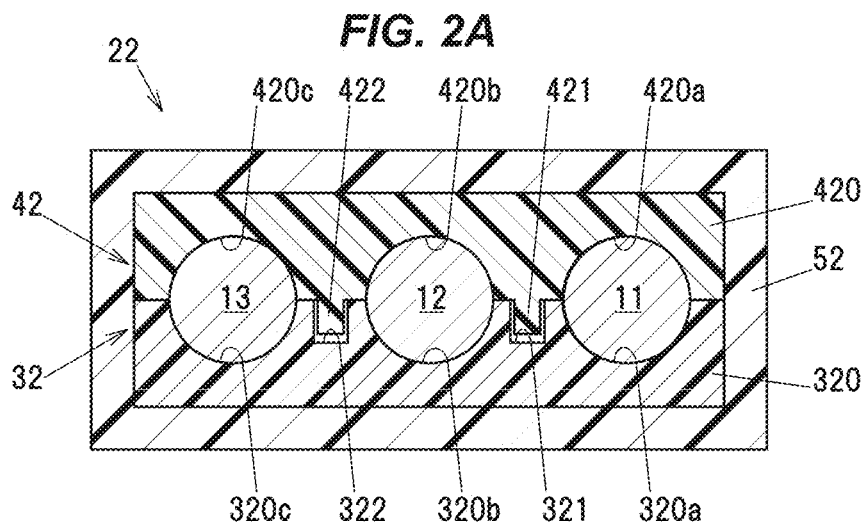
FIG. 2A is a cross-sectional view taken along line A-A of FIG. 1A.
Figure 2B:
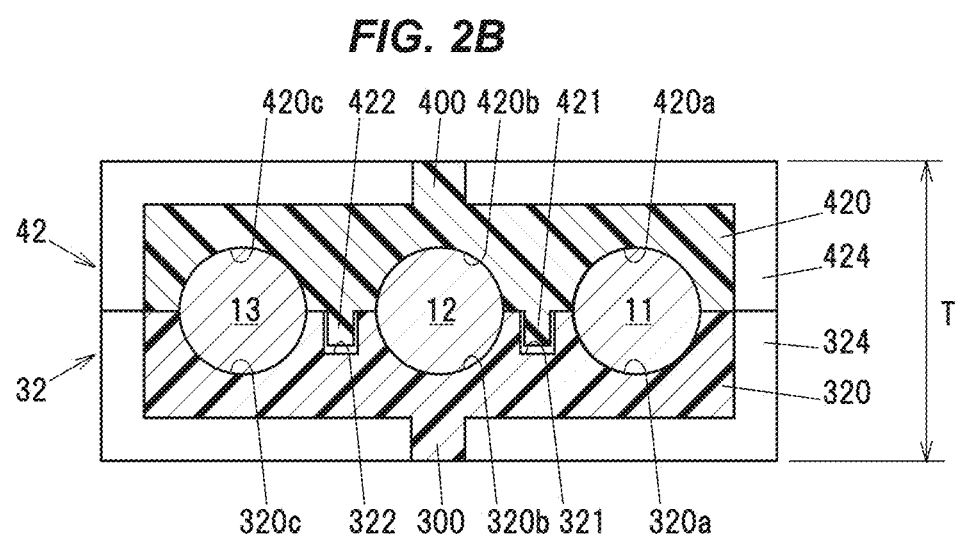
FIG. 2B is a cross-sectional view taken along line B-B of FIG. 1B.
Figure 2C:
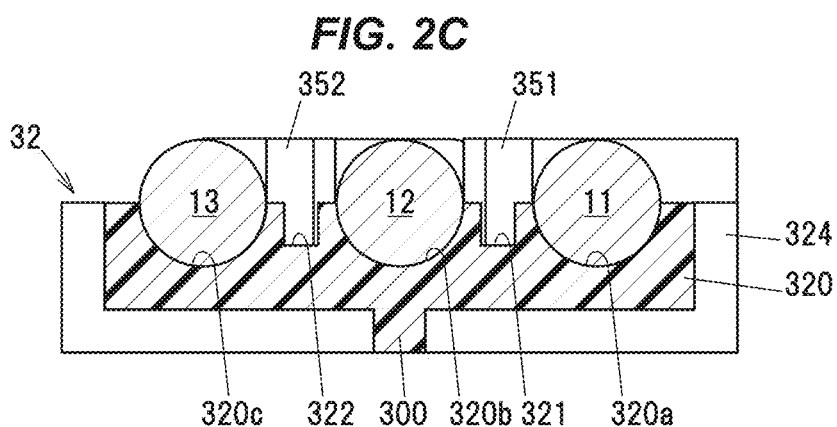
FIG. 2C is a cross-sectional view taken along line C-C of FIG. 1C.
Figure 3A:
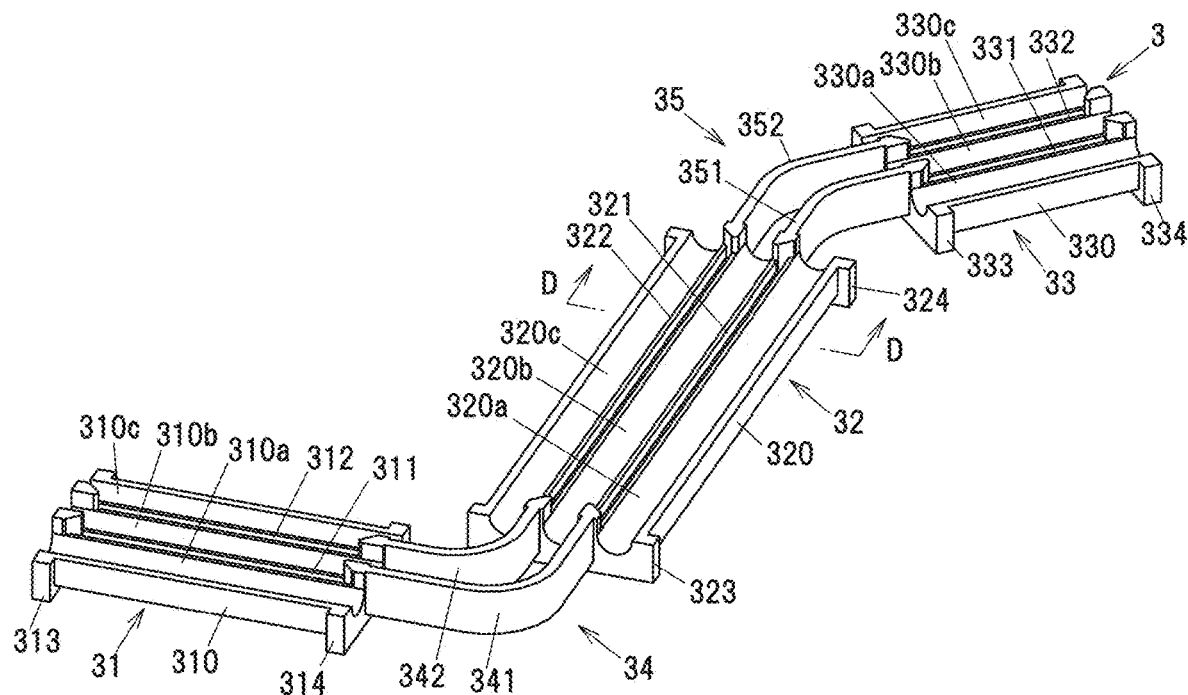
FIG. 3A is a perspective view showing the lower retainer.
Figure 3B:
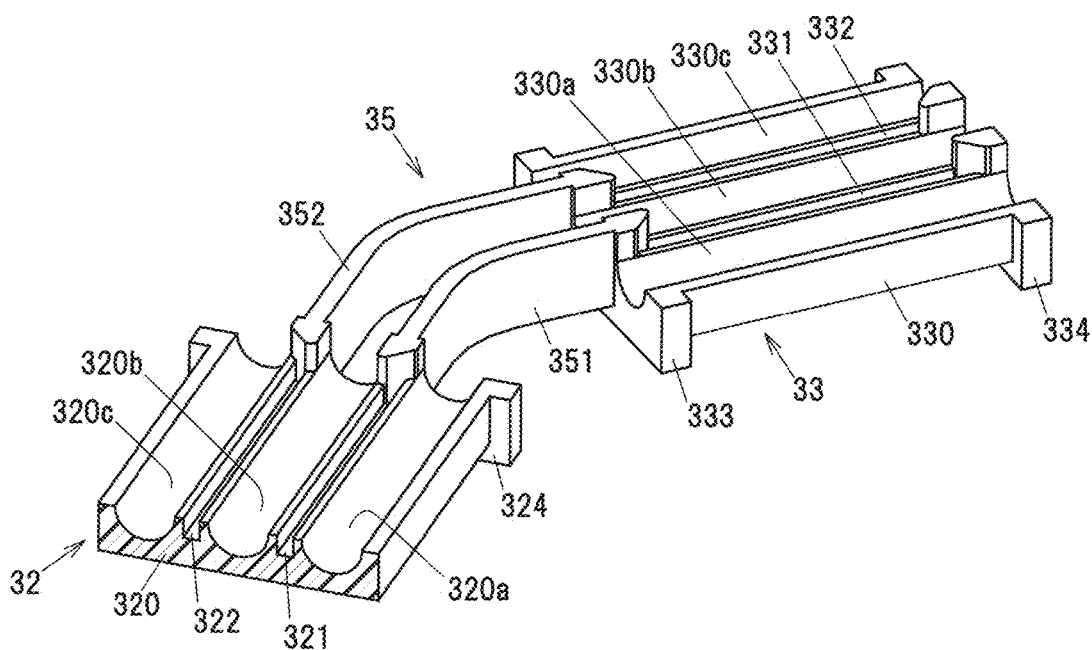
FIG. 3B is a cross-sectional view taken along line D-D of FIG. 3A.
Figure 4A:
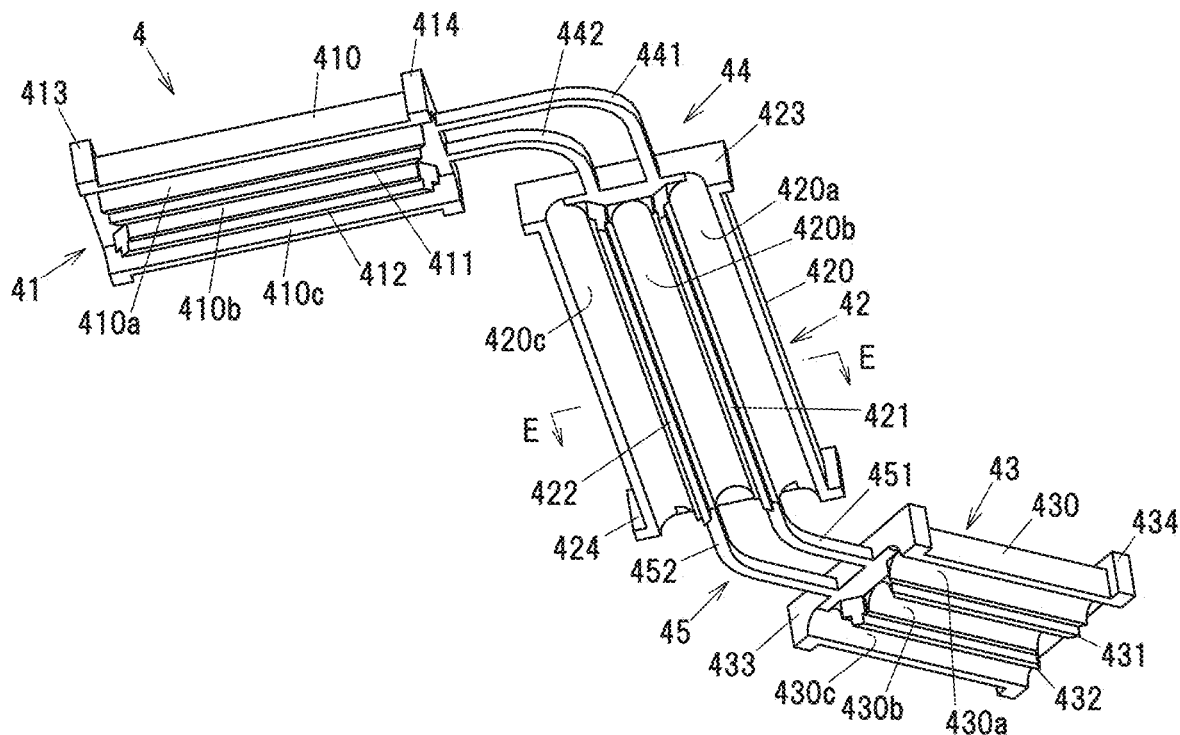
FIG. 4A is a perspective view showing the upper retainer.
Figure 4B:
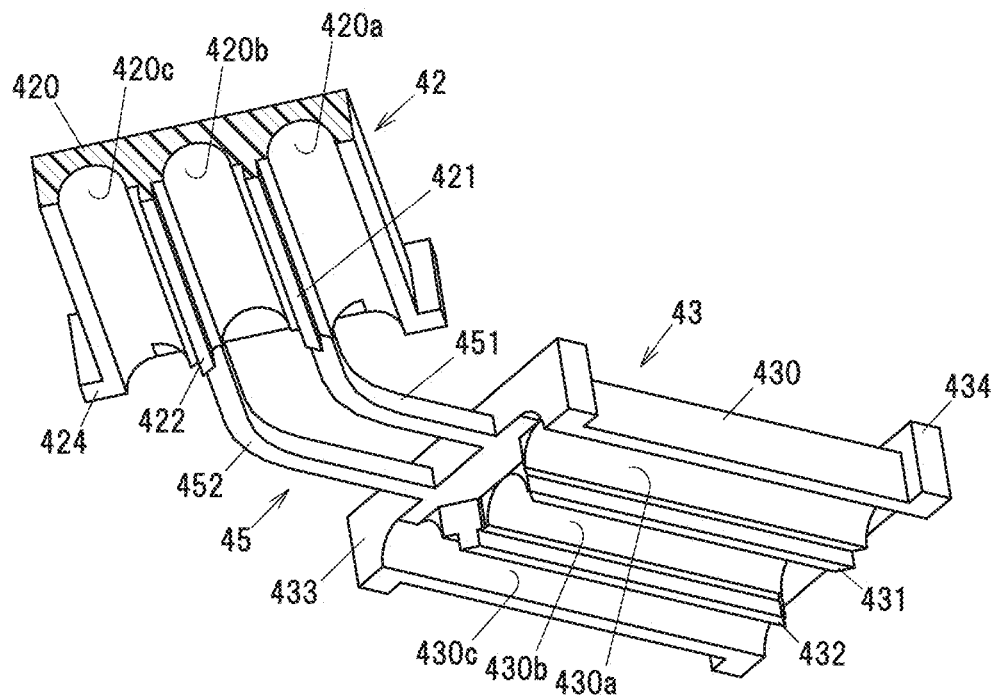
FIG. 4B is a cross-sectional view taken along line E-E of FIG. 4A.

FIG. 1B shows the lower retainer 3 and the upper retainer 4 together with the electric wires 11-13 in a state in which the molded resin member 5 is not formed. FIG. 1C shows the lower retainer 3 and the electric wires 11-13, with further omission of the upper retainer 4. FIG. 2A is a cross-sectional view taken along line A-A of FIG. 1A. FIG. 2B is a cross-sectional view taken along line B-B of FIG. 1B, and FIG. 2C is a cross-sectional view taken along line C-C of FIG. 1C. FIG. 3A is a perspective view showing the lower retainer 3, and FIG. 3B is a cross-sectional view taken along line D-D of FIG. 3A. FIG. 4A is a perspective view showing the upper retainer 4, and FIG. 4B is a cross-sectional view taken along line E-E of FIG. 4A.

The electric wires 11-13 are enamel-coated solid wires and are plastically deformed and bent at plural locations. In addition, the electric wires 11-13 are round wires with a circular shape in a cross-section perpendicular to the longitudinal direction, and have the same thickness (diameter). The diameter of the cross section of the electric wires 11-13 is, e.g., not less than 1 mm. Ends of the electric wires 11-13 on one side are respectively connected to, e.g., a U-phase winding, a V-phase winding and a W-phase winding of a three-phase AC motor. Ends of the electric wires 11-13 on the other side are fixed to, e.g., a terminal block and connected to an inverter that supplies phase currents to the three-phase AC motor. In the following description, the electric wires 11-13 are sometimes respectively referred to as the first electric wire 11, the second electric wire 12 and the third electric wire 13.

(Configuration of Lower Retainer 3)

The lower retainer 3 integrally has first to third sandwiching-holding portions 31-33, and first and second coupling portions 34, 35 that connect between the first to third sandwiching-holding portions 31-33 along the longitudinal direction of the electric wires 11-13.

The first sandwiching-holding portion 31 has a base portion 310 having first to third grooves 310a, 310b, 310c formed to house respective portions of the first to third electric wires 11-13. Recessed portions 311, 312 extending parallel to the first to third grooves 310a, 310b, 310c are formed on the base portion 310 respectively between the first groove 310a and the second groove 310b and between the second groove 310b and the third groove 310c. The first sandwiching-holding portion 31 also has protrusions 313, 314 that are provided at both ends in the longitudinal direction of the electric wires 11-13 to stop a flow of a molten resin at the time of molding the molded resin member 5.

The second and third sandwiching-holding portions 32, 33 are configured in the same manner as the first sandwiching-holding portion 31. That is, the second sandwiching-holding portion 32 integrally has a base portion 320 having first to third grooves 320a, 320b, 320c formed to house respective portions of the first to third electric wires 11-13 and protrusions 323, 324 to stop a flow of the molten resin at the time of molding the molded resin member 5, and recessed portions 321, 322 are formed respectively between the first groove 320a and the second groove 320b and between the second groove 320b and the third groove 320c.

Likewise, the third sandwiching-holding portion 33 integrally has a base portion 330 having first to third grooves 330a, 330b, 330c formed to house respective portions of the first to third electric wires 11-13 and protrusions 333, 334 to stop a flow of the molten resin at the time of molding the molded resin member 5, and recessed portions 331, 332 are formed respectively between the first groove 330a and the second groove 330b and between the second groove 330b and the third groove 330c.

The first coupling portion 34 is composed of a coupling plate 341 interposed between the first electric wire 11 and the second electric wire 12 and a second coupling plate 342 interposed between the second electric wire 12 and the third electric wire 13, and connects the first sandwiching-holding portion 31 to the second sandwiching-holding portion 32. Likewise, the second coupling portion 35 is composed of a coupling plate 351 interposed between the first electric wire 11 and the second electric wire 12 and a second coupling plate 352 interposed between the second electric wire 12 and the third electric wire 13, and connects the second sandwiching-holding portion 32 to the third sandwiching-holding portion 33.

(Configuration of Upper Retainer 4)

The upper retainer 4 integrally has first to third sandwiching-holding portions 41-43, and first and second coupling portions 44, 45 that connect between the first to third sandwiching-holding portions 41-43 along the longitudinal direction of the electric wires 11-13.

The first sandwiching-holding portion 41 has a base portion 410 having first to third grooves 410a, 410b, 410c formed to house respective portions of the first to third electric wires 11-13. Projecting portions 411, 412 extending parallel to the first to third grooves 410a, 410b, 410c are formed on the base portion 410 respectively between the first groove 410a and the second groove 410b and between the second groove 410b and the third groove 410c. The first sandwiching-holding portion 41 also has protrusions 413, 414 that are provided at both ends in the longitudinal direction of the electric wires 11-13 to stop the flow of the molten resin at the time of molding the molded resin member 5.

The second and third sandwiching-holding portions 42, 43 are configured in the same manner as the first sandwiching-holding portion 41. That is, the second sandwiching-holding portion 42 integrally has a base portion 420 having first to third grooves 420a, 420b, 420c formed to house respective portions of the first to third electric wires 11-13 and protrusions 423, 424 to stop a flow of the molten resin at the time of molding the molded resin member 5, and projecting portions 421, 422 are formed respectively between the first groove 420a and the second groove 420b and between the second groove 420b and the third groove 420c.

Likewise, the third sandwiching-holding portion 43 integrally has a base portion 430 having first to third grooves 430a, 430b, 430c formed to house respective portions of the first to third electric wires 11-13 and protrusions 433, 434 to stop a flow of the molten resin at the time of molding the molded resin member 5, and projecting portions 431, 432 are formed respectively between the first groove 430a and the second groove 430b and between the second groove 430b and the third groove 430c.

The first coupling portion 44 is composed of a coupling plate 441 interposed between the first electric wire 11 and the second electric wire 12 and a coupling plate 442 interposed between the second electric wire 12 and the third electric wire 13, and connects the first sandwiching-holding portion 41 to the second sandwiching-holding portion 42. Likewise, the second coupling portion 45 is composed of a coupling plate 451 interposed between the first electric wire 11 and the second electric wire 12 and a coupling plate 452 interposed between the second electric wire 12 and the third electric wire 13, and connects the second sandwiching-holding portion 42 to the third sandwiching-holding portion 43.

(Configuration of Lower Retainer 3 and Upper Retainer 4 when Combined)

The first sandwiching-holding portions 31, 41 of the lower retainer 3 and the upper retainer 4, the second sandwiching-holding portions 32, 42 of the lower retainer 3 and the upper retainer 4 and the third sandwiching-holding portions 33, 43 of the lower retainer 3 and the upper retainer 4 sandwich and hold the longitudinal portions of the first to third electric wires 11-13 at different positions. Distances between the first to third electric wires 11-13 are thereby maintained constant.

The projecting portions 411, 421, 431 of the upper retainer 4 are respectively fitted to the recessed portion 311, 321, 331 of the lower retainer 3 at positions between the first electric wire 11 and the second electric wire 12. Likewise, the projecting portions 412, 422, 432 of the upper retainer 4 are respectively fitted to the recessed portion 312, 322, 332 of the lower retainer 3 at positions between the second electric wire 12 and the third electric wire 13.

Between the first sandwiching-holding portions 31, 41 and the second sandwiching-holding portions 32, 42, the coupling plates 341, 342 of the first coupling portion 34 of the lower retainer 3 are respectively interposed between the first to third electric wires 11-13, and so are the coupling plates 441, 442 of the first coupling portion 44 of the upper retainer 4. Likewise, between the second sandwiching-holding portions 32, 42 and the third sandwiching-holding portions 33, 43, the coupling plates 351, 352 of the second coupling portion 35 of the lower retainer 3 are respectively interposed between the first to third electric wires 11-13, and so are the coupling plates 451, 452 of the second coupling portion 45 of the upper retainer 4.

The first to third electric wires 11-13 are bent between the first sandwiching-holding portions 31, 41 and the second sandwiching-holding portions 32, 42 and between the second sandwiching-holding portions 32, 42 and the third sandwiching-holding portions 33, 43. The coupling plates 341, 342, 441, 442 of the first coupling portions 34, 44 are curved between the first sandwiching-holding portions 31, 41 and the second sandwiching-holding portions 32, 42 along the first to third electric wires 11-13. Meanwhile, the coupling plates 351, 352, 451, 452 of the second coupling portions 35, 45 are curved between the second sandwiching-holding portions 32, 42 and the third sandwiching-holding portions 33, 43 along the first to third electric wires 11-13.

The coupling plate 341 of the first coupling portion 34 of the lower retainer 3 and the coupling plate 441 of the first coupling portion 44 of the upper retainer 4 are aligned in a perpendicular direction relative to the alignment direction of the electric wires 11-13 so as to be in contact with each other and form the wall portion 241 (shown in FIGS. 1A and 1B). Likewise, the coupling plate 342 of the first coupling portion 34 of the lower retainer 3 and the coupling plate 442 of the first coupling portion 44 of the upper retainer 4 are aligned in the perpendicular direction so as to be in contact with each other and form the wall portion 242. The wall portion 241 separates the first electric wire 11 from the second electric wire 12 between the first sandwiching-holding portions 31, 41 and the second sandwiching-holding portions 32, 42, and the wall portion 242 separates the second electric wire 12 from the third electric wire 13 between the first sandwiching-holding portions 31, 41 and the second sandwiching-holding portions 32, 42.

The coupling plate 351 of the second coupling portion 35 of the lower retainer 3 and the coupling plate 451 of the second coupling portion 45 of the upper retainer 4 are aligned in the perpendicular direction relative to the alignment direction of the electric wires 11-13 so as to be in contact with each other and form the wall portion 251. Likewise, the coupling plate 352 of the second coupling portion 35 of the lower retainer 3 and the coupling plate 452 of the second coupling portion 45 of the upper retainer 4 are aligned in the perpendicular direction so as to be in contact with each other and form the wall portion 252. The wall portion 251 separates the first electric wire 11 from the second electric wire 12 between the second sandwiching-holding portions 32, 42 and the third sandwiching-holding portions 33, 43, and the wall portion 252 separates the second electric wire 12 from the third electric wire 13 between the second sandwiching-holding portions 32, 42 and the third sandwiching-holding portions 33, 43.

As shown in FIG. 1A, the molded resin member 5 includes a first surrounding portion 51 that surrounds the base portion 310 of the first sandwiching-holding portion 31 of the lower retainer 3 and the base portion 410 of the first sandwiching-holding portion 41 of the upper retainer 4, a second surrounding portion 52 that surrounds the base portion 320 of the second sandwiching-holding portion 32 of the lower retainer 3 and the base portion 420 of the second sandwiching-holding portion 42 of the upper retainer 4, and a third surrounding portion 53 that surrounds the base portion 330 of the third sandwiching-holding portion 33 of the lower retainer 3 and the base portion 430 of the third sandwiching-holding portion 43 of the upper retainer 4.

The molded resin member 5 is formed by injecting a molten resin into a cavity of a mold in which the first to third electric wires 11-13 and a combined body 10 formed by combining the lower retainer 3 with the upper retainer 4 are arranged as shown in FIG. 1B. Plural boss portions 300 are provided on the lower retainer 3 for fixation in the cavity. One of the boss portions 300 is shown in the FIGS. 2B and 2C. Likewise, plural boss portions 400 are provided on the upper retainer 4 for fixation in the cavity, as shown in FIGS. 1A and 1B.

The first block 21 of the holder 2 is composed of the first sandwiching-holding portions 31, 41 of the lower retainer 3 and the upper retainer 4 and the first surrounding portion 51 of the molded resin member 5. The second block 22 of the holder 2 is composed of the second sandwiching-holding portions 32, 42 of the lower retainer 3 and the upper retainer 4 and the second surrounding portion 52 of the molded resin member 5. The third block 23 of the holder 2 is composed of the third sandwiching-holding portions 33, 43 of the lower retainer 3 and the upper retainer 4 and the third surrounding portion 53 of the molded resin member 5.

(Creepage Distances Between Electric Wires 11-13)

Figure 5A:
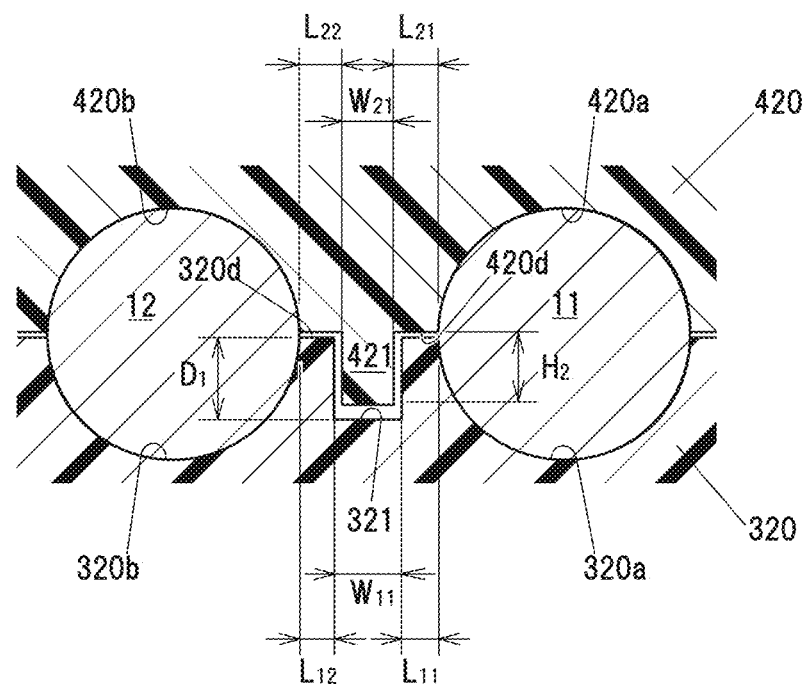
FIG. 5A is a cross-sectional view taken perpendicular to a longitudinal direction of first and second electric wires and showing a second block of the holder around the first and second electric wires.

FIG. 5A is a cross-sectional view taken perpendicular to the longitudinal direction of the first and second electric wires 11, 12 and showing the second block 22 around the first and second electric wires 11, 12. FIG. 5A shows the case where a slight gap is formed between the base portion 320 of the lower retainer 3 and the base portion 420 of the upper retainer 4. Such a gap may be generated due to, e.g., strain generated at the time of molding the lower retainer 3 and the upper retainer 4.

The recessed portion 321 of the lower retainer 3 and the projecting portion 421 of the upper retainer 4 have a rectangular shape in the cross section shown in FIG. 5A. A facing surface 320d, which is a surface of the base portion 320 of the lower retainer 3 facing the base portion 420 of the upper retainer 4, and a facing surface 420d, which is a surface of the base portion 420 of the upper retainer 4 facing the base portion 320 of the lower retainer 3, are flat surfaces parallel to the alignment direction of the first and second electric wires 11, 12 (parallel to the left-right direction of FIG. 5A).

The recessed portion 321 of the lower retainer 3 is recessed from the facing surface 320d of the lower retainer 3 perpendicularly to the alignment direction of the first and second electric wires 11, 12. The projecting portion 421 of the upper retainer 4 is raised from the facing surface 420d perpendicularly to the alignment direction of the first and second electric wires 11, 12.

A depth $D_1$ of the recessed portion 321 is greater than a height $H_2$ of the projecting portion 421, and a width $W_{11}$ of the recessed portion 321 is larger than a width $W_{21}$ of the projecting portion 421. In FIG. 5A, a length between the first groove 320a and the recessed portion 321 on the facing surface 320d of the lower retainer 3 is denoted by $L_{11}$ and a length between the second groove 320b and the recessed portion 321 is denoted by $L_{12}$. In addition, in FIG. 5A, a length between the first groove 420a and the projecting portion 421 on the facing surface 420d of the upper retainer 4 is denoted by $L_{21}$ and a length between the second groove 420b and the projecting portion 421 is denoted by $L_{22}$.

When a creepage distance of the lower retainer 3 between the first electric wire 11 and the second electric wire 12 is defined as $L_1$, $L_1$ is expressed by the following equation (1).

$$L_1 = L_{11} + W_{11} + L_{12} + D_1 \times 2 \qquad (1)$$

Meanwhile, when a creepage distance of the upper retainer 4 between the first electric wire 11 and the second electric wire 12 is defined as $L_2$, $L_2$ is expressed by the following equation (2).

$$L_2 = L_{21} + W_{21} + L_{22} + H_2 \times 2 \qquad (2)$$

Here, since the depth $D_1$ of the recessed portion 321 is greater than the height $H_2$ of the projecting portion 421, the creepage distance $L_2$ of the upper retainer 4 is smaller than the creepage distance $L_1$ of the lower retainer 3. In addition, the creepage distances $L_2$, $L_1$ of the upper retainer 4 and the lower retainer 3 are larger than a distance $D_{01}$, where $D_{01}$ is a minimum distance required to prevent occurrence of partial discharge between the first electric wire 11 and the second electric wire 12 with a maximum potential difference which can occur between the first electric wire 11 and the second electric wire 12.

Although the details are not shown in the drawing, a portion of the second block 22 around the second and third electric wires 12, 13 and portions of the first and third blocks 21, 23 around the first to third electric wires 11-13 are also configured in the same manner.

Figure 5B:
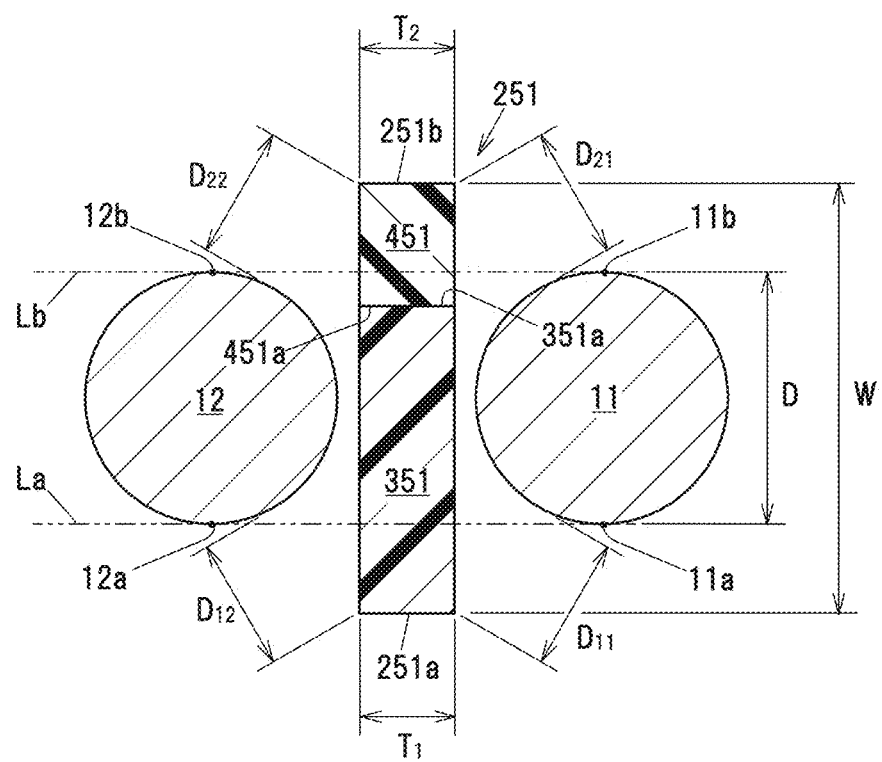
FIG. 5B is a cross-sectional view showing the first and second electric wires and a wall portion.

FIG. 5B is a cross-sectional view taken perpendicular to the longitudinal direction of the first and second electric wires 11, 12 and showing the first and second electric wires 11, 12 located between the second block 22 and the third block 23 and also showing the wall portion 251 connecting the second block 22 to the third block 23. The wall portion 251 is composed of the coupling plate 351 of the second coupling portion 35 of the lower retainer 3 and the coupling plate 451 of the second coupling portion 45 of the upper retainer 4 as described above, and the coupling plates 351, 451 are in contact with each other at their contact surfaces 351a, 451a. In the present embodiment, these contact surfaces 351a, 451a are flat surfaces parallel to the alignment direction of the first and second electric wires 11, 12. It is desirable that the contact surface 351a of the coupling plate 351 of the lower retainer 3 and the contact surface 451a of the coupling plate 451 of the upper retainer 4 come into elastic contact with each other when, e.g., the combined body 10 is formed by combining the lower retainer 3 with the upper retainer 4.

A width W of the wall portion 251 in a perpendicular direction relative to the alignment direction of the first and second electric wires 11, 12 (in the vertical direction of FIG. 5B) is greater than a thickness (diameter D) of the first and second electric wires 11, 12. In addition, the width W of the wall portion 251 is not more than a combined thickness T of the first, second, third sandwiching-holding portion 31, 32, 33 of the lower retainer 3 and the first, second, third sandwiching-holding portion 41, 42, 43 of the upper retainer 4 stacked in the perpendicular direction (see FIG. 2B).

In FIG. 5B, a lower straight line La connecting a lower end 11a (lower side in the perpendicular direction) of the first electric wire 11 and a lower end 12a of the second electric wire 12 and an upper straight line Lb connecting an upper end 11b (upper side in the perpendicular direction) of the first electric wire 11 and an upper end 12b of the second electric wire 12 are indicated by dash-dot-dot lines. The wall portion 251 is positioned such that an end portion in the perpendicular direction protrudes downward beyond the lower straight line La and the other end portion in the perpendicular direction protrudes upward beyond the upper straight-line Lb.

When the shortest distance between the first electric wire 11 and the second electric wire 12 via a lower end surface 251a (lower side in the width direction) of the wall portion 251 is defined as $L_3$, $L_3$ is expressed by the following equation (3):

$$L_3 = D_{11} + T_1 + D_{12} \qquad (3)$$

where $D_{11}$ is the shortest distance between the first electric wire 11 and an edge of the lower end surface 251a on the first electric wire 11 side, $T_1$ is a length of the lower end surface 251a in the alignment direction of the first and second electric wires 11, 12, and $D_{12}$ is the shortest distance between the second electric wire 12 and an edge of the lower end surface 251a on the second electric wire 12 side.

Likewise, when the shortest distance between the first electric wire 11 and the second electric wire 12 via an upper end surface 251b (upper side in the width direction) of the wall portion 251 is defined as $L_4$, $L_4$ is expressed by the following equation (4):

$$L_4 = D_{21} + T_2 + D_{22} \qquad (4)$$

where $D_{21}$ is the shortest distance between the first electric wire 11 and an edge of the upper end surface 251b on the first electric wire 11 side, $T_2$ is a length of the upper end surface 251b in the alignment direction of the first and second electric wires 11, 12, and $D_{22}$ is the shortest distance between the second electric wire 12 and an edge of the upper end surface 251b on the second electric wire 12 side.

The shortest distances $L_3$, $L_4$ are greater than a distance $D_{O2}$, where $D_{O2}$ is a minimum distance required to prevent occurrence of partial discharge between the first electric wire 11 and the second electric wire 12 over the wall portion 251 with a maximum potential difference which can occur between the first electric wire 11 and the second electric wire 12.

Although the details are not shown in the drawings, the other wall portions 241, 242, 252 are also configured in the same manner.

Comparative Example

Figure 6A:
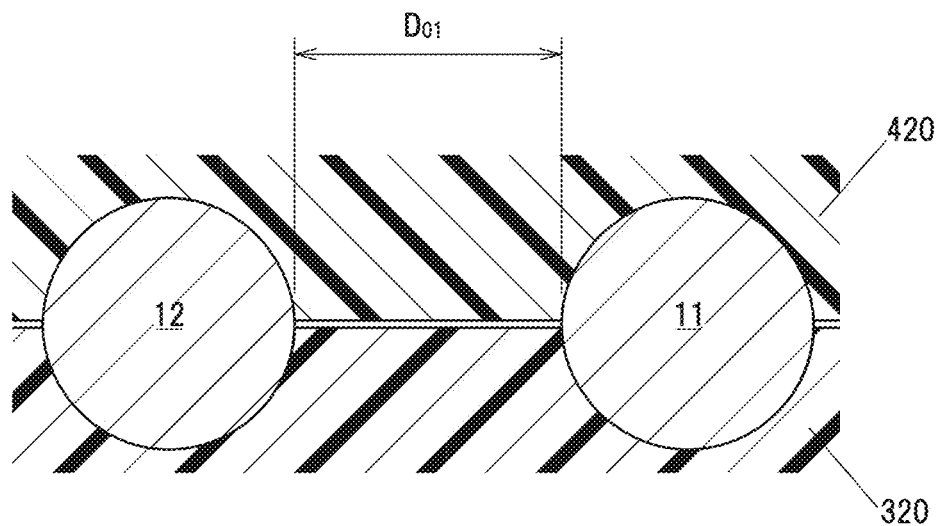
FIGS. 6A and 6B are cross-sectional views in Comparative Example.
Figure 6B:
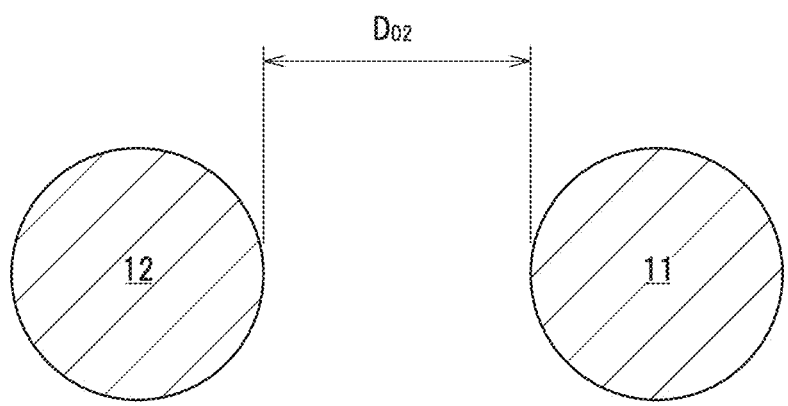

Next, as Comparative Example, FIG. 6A shows a cross-sectional view when the recessed portion 321 and the projecting portion 421 shown in FIG. 5A are not provided and the distance between the first electric wire 11 and the second electric wire 12 is $D_{O1}$ described above. FIG. 6B shows a cross-sectional view when the wall portion 251 shown in FIG. 5B is not provided and the distance between the first electric wire 11 and the second electric wire 12 is $D_{O2}$ described above.

As shown in FIGS. 6A and 6B, when the recessed portion 321 and the projecting portion 421 or the wall portion 251 are not provided, a wide space is required between the first electric wire 11 and the second electric wire 12 to prevent partial discharge.

Functions and Effects of the Embodiment

In the embodiment described above, it is possible to prevent occurrence of electric discharge between the plural electric wires 11-13 while suppressing the distances between the plural electric wires 11-13. Therefore, the installation space for the wiring component 1 can be reduced and, when using the wiring component 1 to, e.g., supply currents to an electric motor as a driving source of an automobile, mountability to the automobile is enhanced.

In addition, in the embodiment described above, since the width W of the wall portion 251 is not more than the combined thickness T of the first, second, third sandwiching-holding portion 31, 32, 33 of the lower retainer 3 and the first, second, third sandwiching-holding portion 41, 42, 43 of the upper retainer 4 stacked in the perpendicular direction, the maximum thickness of the holder 2 can be kept down to this thickness T and it is thereby possible to reduce the size of the wiring component 1.

In addition, in the embodiment described above, since the base portions 310, 320, 330 of the lower retainer 3 and the base portions 410, 420, 430 of the upper retainer 4 are surrounded and integrated by the first to third surrounding portions 51, 52, 53 of the molded resin member 5, the lower retainer 3 is firmly fixed to the upper retainer 4, which increase rigidity to hold the plural electric wires 11-13 and also improves vibration resistance.

SUMMARY OF THE EMBODIMENT

Technical ideas understood from the embodiment will be described below citing the reference signs, etc., used for the embodiment. However, each reference sign, etc., described below is not intended to limit the constituent elements in the claims to the members, etc., specifically described in the embodiment.

[1] A wiring component (1), comprising: a plurality of electric wires (11-13) aligned in a predetermined alignment direction; and a holder (2) to hold the plurality of electric wires (11-13), wherein the holder (2) comprises a pair of resin members (the lower retainer 3 and the upper retainer 4) that sandwich longitudinal portions of the plurality of electric wires (11-13) in a perpendicular direction perpendicular to the alignment direction, and wherein the pair of resin members (3, 4) are recess-projection fitted between the plurality of electric wires (11-13).

[2] The wiring component (1) defined by [1], wherein each of the pair of resin members (3, 4) comprises a plurality of grooves (310a, 310b, 310c, 320a, 320b, 320c, 330a, 330b, 330c/410a, 410b, 410c, 420a, 420b, 420c, 430a, 430b, 430c) to house the plurality of electric wires (11-13), wherein one (4) of the pair of resin members (3, 4) comprises projecting portions (411, 412, 421, 422, 431, 432) between the plurality of grooves (410a, 410b, 410c, 420a, 420b, 420c, 430a, 430b, 430c), wherein the other (3) of the pair of resin members (3, 4) comprises recessed portions (311, 312, 321, 322, 331, 332) between the plurality of grooves (310a, 310b, 310c, 320a, 320b, 320c, 330a, 330b, 330c), and wherein the projecting portions (411, 412, 421, 422, 431, 432) are fitted to the recessed portions (311, 312, 321, 322, 331, 332).

[3] The wiring component (1) defined by [1] or [2], wherein each of the pair of resin members (3, 4) comprises a plurality of sandwiching-holding portions (31-33/41-43) and coupling portions (34, 35/44, 45) connecting between the plurality of sandwiching-holding portions (31-33/41-43), wherein the respective plurality of sandwiching-holding portions (31-33 and 41-43) of the pair of resin members (3, 4) sandwich and hold the longitudinal portions of the plurality of electric wires (11-13) at different positions, and wherein the coupling portions (34, 35 and 44, 45) located between the plurality of sandwiching-holding portions (31-33 and 41-43) are interposed between the plurality of electric wires (11-13).

[4] The wiring component (1) defined by [3], wherein the coupling portions (34, 35) of one (3) of the pair of resin members (3, 4) and the coupling portions (44, 45) of the other resin member (4) are aligned in the perpendicular direction so as to be in contact with each other and form wall portions (241, 242, 251, 252) separating the plurality of electric wires (11-13) between the plurality of sandwiching-holding portions (31-33 and 41-43), and wherein a width of the wall portion (241, 242, 251, 252) in the perpendicular direction is greater than a thickness (diameter D) of each of the plurality of electric wires (11-13) in the perpendicular direction.

[5] The wiring component (1) defined by [4], wherein the width of the wall portion (241, 242, 251, 252) in the perpendicular direction is not more than a combined thickness (T) of the respective plurality of sandwiching-holding portions (31-33 and 41-43) of the pair of resin members (3, 4) stacked in the perpendicular direction.

[6] The wiring component (1) defined by any one of [1] to [5], wherein the holder (2) comprises a molded resin member (5) molded to cover and integrate the pair of resin members (3, 4).

[7] The wiring component (1) defined by [6], wherein the pair of resin members (3, 4) comprise protrusions (313, 314, 323, 324, 333, 334, 413, 414, 423, 424, 433, 434) at ends of the sandwiching-holding portions (31-33 and 41-43) in a longitudinal direction of the plurality of electric wires (11-13), the protrusions stopping a flow of a molten resin at the time of molding the molded resin member (5).

Although the embodiment of the invention has been described, the invention according to claims is not to be limited to the embodiment described above. Further, please note that not all combinations of the features described in the embodiment are necessary to solve the problem of the invention.

Although the wiring component 1 having the three electric wires 11-13 has been described in the embodiment, the number of electric wires is not limited thereto and may be two, or may be not less than four. In addition, the cross-sectional shape of the electric wires is not limited to the circular shape, and the cross section of the electric wires may be rectangular.

In addition, although the recessed portions 321 and the projecting portions 421 which have a rectangular cross-sectional shape have been described in the embodiment, it is not limited thereto. Recessed portions and projecting portions which have, e.g., a triangular cross-sectional shape or a trapezoidal cross-sectional shape may be provided on the lower retainer 3 and the upper retainer 4.

In addition, although the example in which the facing surfaces 320d, 420d as flat surfaces parallel to the alignment direction of the first and second electric wires 11, 12 are provided in the vicinity of the recessed portion 321 and the projecting portion 421 as shown in FIG. 5A has been described in the embodiment, the entire portion between the first and second electric wires 11, 12 may be the recessed portion or the projecting portion without having the facing surfaces 320d, 420d.

In addition, although the example in which the coupling plate 351 of the lower retainer 3 and the coupling plate 451 of the upper retainer 4 are in contact with each other at the flat contact surfaces 351a, 451a as shown in FIG. 5B has been described in the embodiment, it is not limited thereto. These coupling plates 351, 451 may be recess-projection fitted.

The invention claimed is:

1. A wiring component, comprising:
a plurality of electric wires aligned in a predetermined alignment direction; and
a holder to hold the plurality of electric wires,
wherein the holder comprises a pair of resin members that sandwich longitudinal portions of the plurality of electric wires in a perpendicular direction perpendicular to the alignment direction,
wherein the pair of resin members are recess-projection fitted between the plurality of electric wires,
wherein each of the pair of resin members comprises a plurality of sandwiching-holding portions and coupling portions connecting between the plurality of sandwiching-holding portions,
wherein the respective plurality of sandwiching-holding portions of the pair of resin members sandwich and hold the longitudinal portions of the plurality of electric wires at different positions, and
wherein the coupling portions located between the plurality of sandwiching-holding portions are interposed between the plurality of electric wires.

2. The wiring component according to claim 1,
wherein each of the pair of resin members comprises a plurality of grooves to house the plurality of electric wires,
wherein one of the pair of resin members comprises projecting portions between the plurality of grooves,
wherein the other of the pair of resin members comprises recessed portions between the plurality of grooves, and
wherein the projecting portions are fitted to the recessed portions.

3. The wiring component according to claim 1,
wherein the coupling portions of one of the pair of resin members and the coupling portions of the other resin member are aligned in the perpendicular direction so as to be in contact with each other and form wall portions separating the plurality of electric wires between the plurality of sandwiching-holding portions, and
wherein a width of the wall portion in the perpendicular direction is greater than a thickness of each of the plurality of electric wires in the perpendicular direction.

4. The wiring component according to claim 3, wherein the width of the wall portion in the perpendicular direction is not more than a combined thickness of the respective plurality of sandwiching-holding portions of the pair of resin members stacked in the perpendicular direction.

5. A wiring component, comprising:
a plurality of electric wires aligned in a predetermined alignment direction; and
a holder to hold the plurality of electric wires,
wherein the holder comprises a pair of resin members that sandwich longitudinal portions of the plurality of electric wires in a perpendicular direction perpendicular to the alignment direction,
wherein the pair of resin members are recess-projection fitted between the plurality of electric wires, and
wherein the holder comprises a molded resin member molded to cover and integrate the pair of resin members.

6. The wiring component according to claim 5, wherein the pair of resin members comprise protrusions at ends of the plurality of sandwiching-holding portions in a longitudinal direction of the plurality of electric wires, the protrusions stopping a flow of a molten resin at the time of molding the molded resin member.

* * * * *